(12) United States Patent
Mastio

(10) Patent No.: US 7,493,115 B2
(45) Date of Patent: Feb. 17, 2009

(54) METHOD AND DEVICE FOR THE MANAGEMENT AND STORAGE OF NON-VOLATILE DATA RELATIVE TO A COMMUNICATING DEVICE

(75) Inventor: Daniel Mastio, Saint-Martin-D'Heres (FR)

(73) Assignee: STMicroelectronics SA, Montrouge (FR)

( * ) Notice: Subject to any disclaimer, the term of this patent is extended or adjusted under 35 U.S.C. 154(b) by 534 days.

(21) Appl. No.: 10/872,323

(22) Filed: Jun. 18, 2004

(65) Prior Publication Data
US 2005/0032515 A1 Feb. 10, 2005

(30) Foreign Application Priority Data
Jun. 19, 2003 (FR) .................................. 03 07416

(51) Int. Cl.
*H04Q 7/20* (2006.01)
(52) U.S. Cl. .................................... 455/423; 455/67.11
(58) Field of Classification Search ................. 455/423, 455/412.1, 410, 411, 426.1, 67.11, 550.1, 455/557
See application file for complete search history.

(56) References Cited

U.S. PATENT DOCUMENTS

| 6,377,894 | B1 * | 4/2002 | Deweese et al. ............... 702/22 |
| 2002/0077093 | A1 | 6/2002 | Maloney et al. |
| 2002/0196029 | A1 | 12/2002 | Schmidt |
| 2002/0196748 | A1 | 12/2002 | De Mier |
| 2003/0040873 | A1 * | 2/2003 | Lesesky et al. ................. 702/57 |
| 2004/0203467 | A1 * | 10/2004 | Liu et al. .................. 455/67.14 |

FOREIGN PATENT DOCUMENTS

GB 2 372 910 9/2002

* cited by examiner

*Primary Examiner*—Sam Bhattacharya
(74) *Attorney, Agent, or Firm*—Lisa K. Jorgenson; Jon A. Gibbons; Fleit Gibbons Gutman Bongini & Bianco P.L.

(57) ABSTRACT

A wireless communication interface (2) of a communicating device (1) to which an identification address (BD_ADD) is assigned for communicating. The interface (2) includes radio frequency circuits (4) and a memory (32) for recording data relative to an operating test phase of the radio frequency circuits. According to the invention, the memory (32) is rendered hardware interdependent of the radio frequency circuits (4) of the communication interface (2). The identification address (BD_ADD) is written into the memory (32). Applications of the present invention include wireless networks and pico-networks such as "Bluetooth," "Zig Bee," and similar protocol.

20 Claims, 5 Drawing Sheets

METHOD AND DEVICE FOR THE MANAGEMENT AND STORAGE OF NON-VOLATILE DATA RELATIVE TO A COMMUNICATING DEVICE

CROSS-REFERENCE TO RELATED APPLICATIONS

This application is based upon and claims priority from prior French Patent Application No. 03 07416 filed on Jun. 19, 2003 the entire disclosure of which is herein incorporated by reference.

FIELD OF THE INVENTION

The present invention generally relates to a method and device for managing and storing non-volatile data relative to a communicating device, for example, equipped with a communication interface adapted to a pico-network such as a protocol wireless network using the protocol called "Bluetooth," "Zig bee," or similar. More specifically, the present invention provides a method of storing this non-volatile data, including the device network address for the Bluetooth protocol.

BACKGROUND OF THE INVENTION

Wireless pico-networks are a technology designed to replace the interconnection cables of a fixed or mobile assembly of devices locally linked in a typical ray path, normally of approximately 10 m or even more. As an illustrative example, the devices with pico-networks include a workstation along with peripherals, such as a keyboard, a mouse, and a printer. Other pico-network devices can include a personal digital assistant (PDA), a mobile telephone, audio and video equipment, a server, and more.

Governing an increasing number of electronic hardware manufacturers, the Bluetooth protocol is currently considered the universal platform for wireless pico-networks, allowing transparent communication between many different types of office, personal, household, and institutional devices. Furthermore, its development is directed at functionalities, such as securing transactions, and goes well beyond simply establishing communication of devices grouped within a single vicinity.

As indicated in FIG. 1, the Bluetooth protocol is based on a stack of protocol layers 2, whose lowest layer 4, called the radio layer, constitutes the connection interface that allows bidirectional wireless communication using an antenna 6. Above this layer are then found the baseband layer 8 and a link management protocol layer 10 (known as "link manager protocol" or "LMP"). These two layers 8 and 10 are essentially used to establish and control the links between the various Bluetooth devices. The three above-mentioned layers 4, 8, and 10 are generally implemented in the form of hardware or firmware.

Above the link management protocol layer 10 is the host controller layer 12 ("host controller" or HCL) required for the interface between the Bluetooth hardware elements and the upper protocol 14 (called "logical link control and adaptation protocol" or L2CAP). The host controller 12 is only necessary when the upper protocol 14 resides in a host as software. If the Bluetooth module itself includes an L2CAP layer, this upper layer 14 may no longer be necessary because the resident L2CAP layer would then be able to communicate directly with the LMP 10 and baseband 8 layers.

The applications 16 reside above the L2CAP layer 14 and communicate with it through an adapted software layer 18 (TCS, SDP, RFCOMM, and more.)

The baseband layer 8 includes, in particular, the address and security elements of the communicating device. Among these elements, there is the unique address of the device, called BD_ADD (or BD_Address) in the Bluetooth standard, through which the device can be called and identified in the pico-network. The uniqueness of this address is guaranteed by the IEEE (Institute of Electrical and Electronic Engineers) organization, which assigns communicating device manufacturers part of the specific address for each physical device placed in circulation.

The BD_ADD address of the Bluetooth protocol is presented in the form of a 48-bit binary word, in which 24 bits are provided by IEEE and constitute, for a given manufacturer, a unique portion of addresses, from which each device placed in circulation can be singled out using an additional 24 bits.

Overall, a BD_ADD Bluetooth address is divided into the following: i) a lower 24-bit portion, called LAP, ii) a non-significant portion of 16 bits called NAP, and iii) an upper 8-bit portion called UAP.

At the radio 4 layer and/or baseband 8 layer level, among other things, a series of tests, and if necessary, calibration of radio frequency circuits must be performed to ensure that they comply correctly with the required characteristics for the reception and transmission modes.

FIG. 2 represents, in the form of a flowchart, the elements that normally intervene in the service activation phase of a communicating device 1 equipped with a Bluetooth wireless interface 2.

The service activation includes a writing phase, into the device, of its unique BD_ADD address. This writing operation is done either in postproduction or during production, but at a final stage, in particular, the stage in which each device is tested individually. Indeed, given that this BD_ADD address is, by its nature, different for each device 1, its writing cannot be done through a common manufacturing process. Therefore, an electrically programmable memory 20 resident in the device 1 is used for this purpose. This memory is normally an EEPROM (Electrically Erasable Programmable Read Only Memory)-type memory as in the case illustrated, or a "Flash"-type memory. This memory 20 can also be used, depending on the applications, for storing other non-volatile data relative to the functionalities of the device 1, for example, encryption/decryption data in the form of a key.

All the data to be written into the electrically programmable memory 20 is provided by an external BD_ADD address programming unit 22 that is functionally linked to the Bluetooth device 1 using a communications link L1 during service activation. As a variant, this EEPROM memory 20 can be programmed outside the device and inserted into the device at a later stage. The programming unit 22 integrates, in particular, the sequence of BD_ADD addresses that will then be written into the programmable memory 20 of each device.

Another stage in the service activation of the device 1 includes tests, and if necessary, calibration of radio frequency circuits at the radio layer 4 level. For this stage, an external unit 24 is used, called test/calibration equipment herein, which establishes a first link L2 with the Bluetooth device using a radio frequency cable. The data exchanged by this cable can be used to determine the characteristics of the radio circuit signals, in particular, critical parameters that influence the communication (exact frequency, transmission power, sensitivity, and more.) and that are subject to possible variances in production or that must be individualized.

The test/calibration equipment 24 is also linked, on the one hand, to logical command inputs of the radio circuits 4 (digital link L3) and, on the other, to a second memory 30 designed to save the test data. Normally, this memory 30 is also an EEPROM-type memory and can be presented as an external part that can be inserted into the Bluetooth device 1. This memory 30 receives, for writing, the validation and/or calibration data, as well as other corrections sent by the equipment 24 according to the analysis of the critical communication parameters. In the simplest case, the internal memory 30 does not store the calibration data. It only stores the data that indicates whether the tests were passed successfully, possibly including a certificate, test conditions, and more. This is, in particular, the case when the manufacturing variations are sufficiently narrow so that the specifications are systematically respected if the radio circuits work. The tests are designed to detect malfunctions. If there are significant individual variations, or the specifications are very strict, calibration values can be written into the memory 30. These values are then exploited during the operation of the device 1. As such, the latter will ensure a correct communication despite any manufacturing differences in its characteristics, and will remain in compliance with respect to any adaptations of the foreseen application.

The above description of device communication although useful, it requires extensive use of memory resources. Accordingly, what is need is a solution to provide a better use of the memory resources and of the data integration when the communicating device is placed into service.

SUMMARY OF THE INVENTION

Briefly in accordance with the present invention, provided is an implementation method of a wireless communication interface of a communicating device to which an identification address is assigned for communication. The interface includes radio frequency circuits and a memory designed for saving the data relative to an operating test phase of the radio frequency circuits. The interface includes memory which is rendered interdependent of the radio frequency circuits of the communication interface. The interface includes an identification address which is written in the memory.

The memory can be integrated/implemented into a chip of the radio frequency circuits of the communication interface.

The method can perform at least one test for the communication interface and write the following into the memory, without regard to order:
at least one data element relative to this test, and
the identification address,
when the interface is in its encapsulated product form.

The identification address can be written into the memory before the radio frequency circuits are integrated into the other elements that comprise the wireless communication interface.

The identification address can also be written into the memory after the radio frequency circuits have been integrated into the other elements of the wireless communication interface, and before the integration of the latter into the communicating device.

The device can be of the type that communicates over a wireless network, with the identification address as the address through which the device is recognized on the network.

The device can be of the type that communicates over a pico-network, according to the Bluetooth or similar protocols.

The memory can be of the type that is programmable, in particular of the type that is only programmable once (known as "one time programmable").

Further, other data, normally grouped with the identification address, can be stored in the memory.

In addition, at least one of the following can also be stored in the memory:
encryption/decryption data, for example, a key,
data relative to a specific operating mode,
customization data.

The data relative to an operating test phase of the interface can include at least one of the following:
an indication of the compliance of the interface with respect to a tested parameter or a tested set of parameters,
a certificate of validity in compliance with the communication protocol,
calibration or correction data of the communication interface circuits.

According to a second aspect, the invention relates to a wireless communication interface designed for a communicating device to which an identification address is assigned for communicating. The interface includes radio frequency circuits and a memory designed to record the data relative to an operating test phase of the radio frequency circuits,
characterized in that:
the memory is hardware integrated with the communication interface radio frequency circuits, and in that
the memory also stores the identification address.

The aspects of the invention presented within the framework of the method according to the first aspect can be applied mutatis mutandis to this interface.

According to a third aspect, the invention relates to a communicating device, characterized in that it incorporates a communication interface according to the second aspect.

According to a fourth aspect, the invention relates to an identification method of a communicating device according to the third aspect, including a stage whereby the identification address is read and supplied to a claimant, characterized in that this stage includes the reading of the identification address from the memory further serving to record the data relative to the operating test phase of the interface.

This method can include a stage of reading and providing a claimant with at least one other data element, normally grouped with the specific address. This stage includes reading the other data element from the memory also used to record the data relative to the operating test phase of the interface.

According to a fifth aspect, the invention relates to a device designed to implement the method according to the first aspect, characterized in that it combines the test functionalities of the radio frequency circuits and the writing of the identification address. The device is equipped with a connection port whose output is adapted to access the memory to write into it, on the one hand, the identification address, and on the other, the data relative to the test.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

The invention and the advantages that it offers will be more evident upon reading the description included after the preferred embodiments. The latter are provided only as non-limiting examples, with reference to the attached drawings in which.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
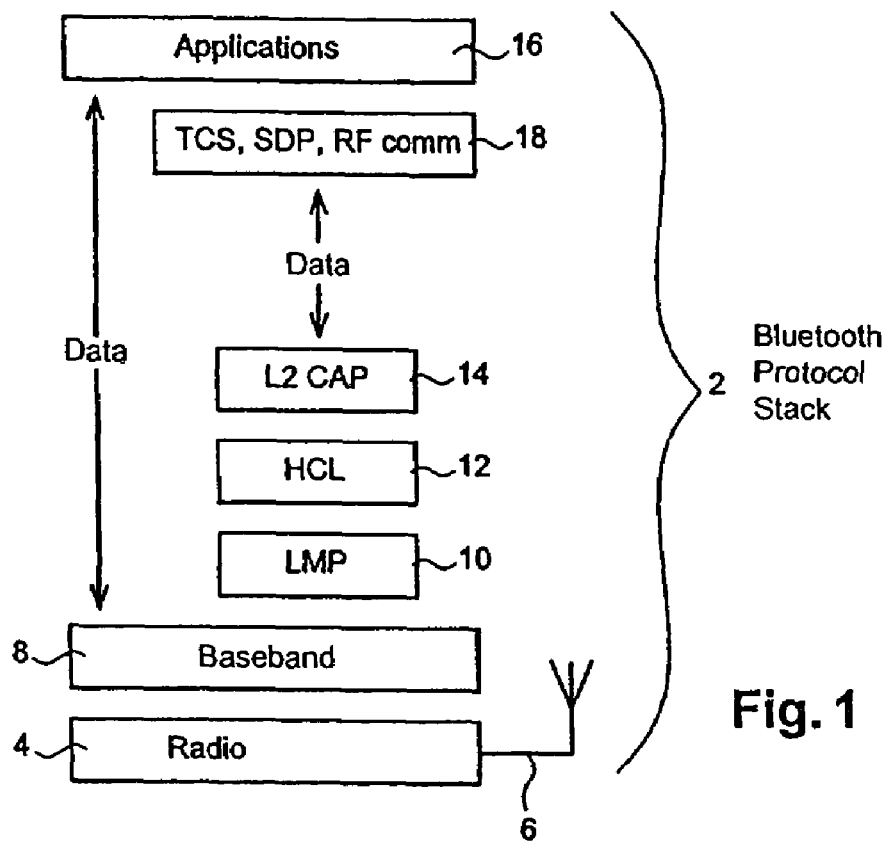
FIG. 1, is a prior art block diagram that shows the principal layers that act in a wireless pico-network according to the Bluetooth protocol.
Figure 2:
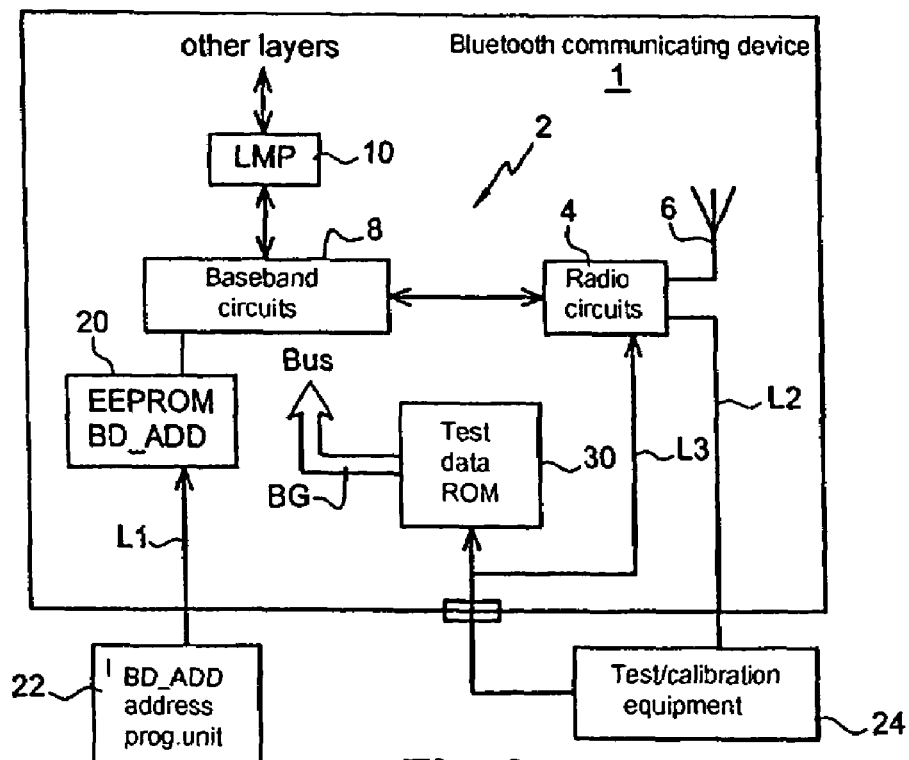
FIG. 2, a prior art flowchart that illustrates the elements that act during the individualization and test of the radio layer of a communicating device according to the Bluetooth protocol, depending on the state of the art.
Figure 3:
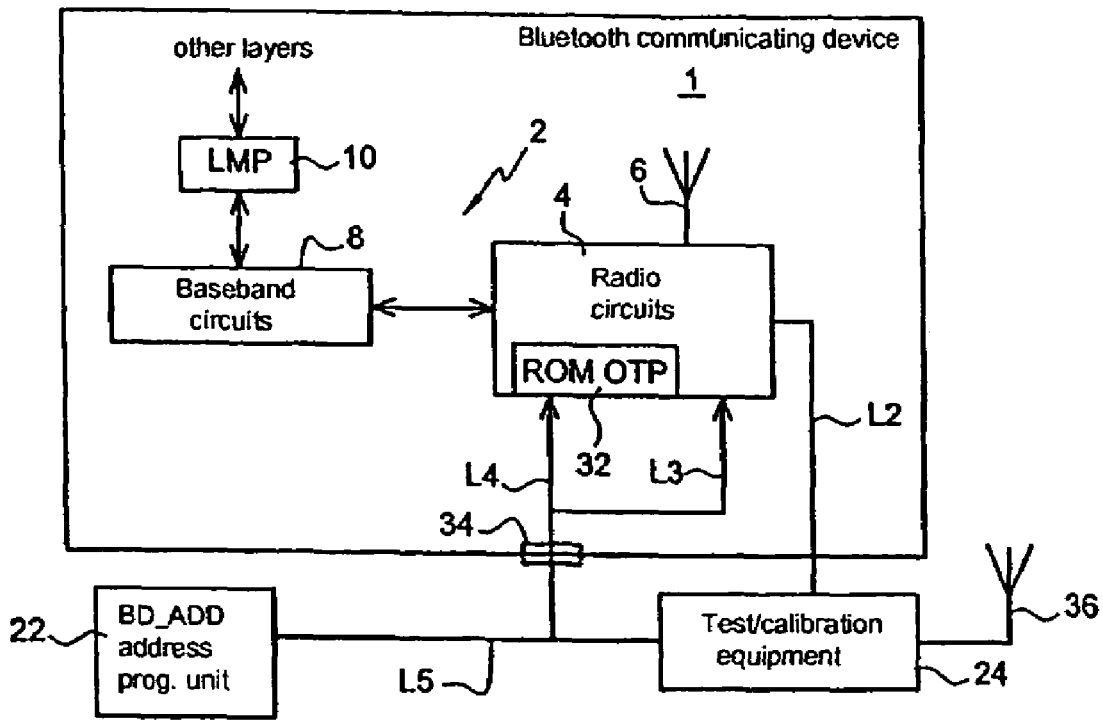
FIG. 3 is a flowchart according to a first embodiment of the invention that illustrates the embodiment and preparation of a communicating device according to the Bluetooth protocol.
Figure 4:
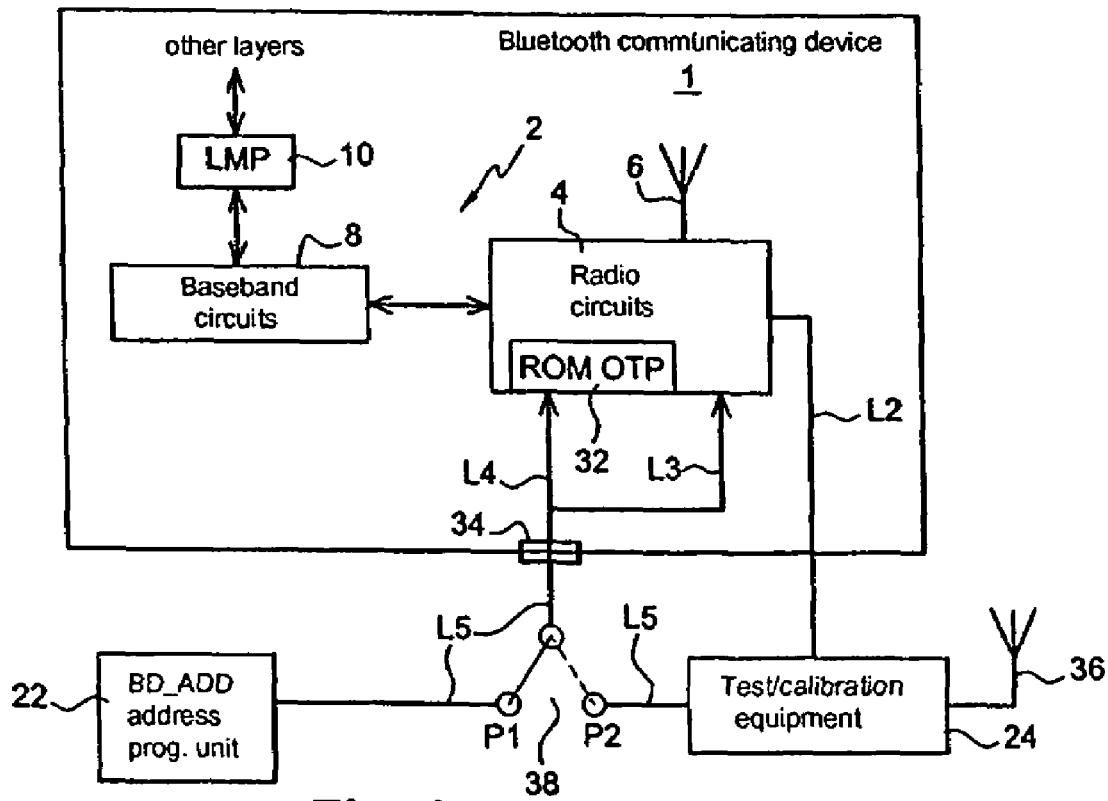
FIG. 4 is a flowchart according to a second embodiment of the invention that illustrates the preparation of a communicating device according to the Bluetooth protocol.
Figure 5:
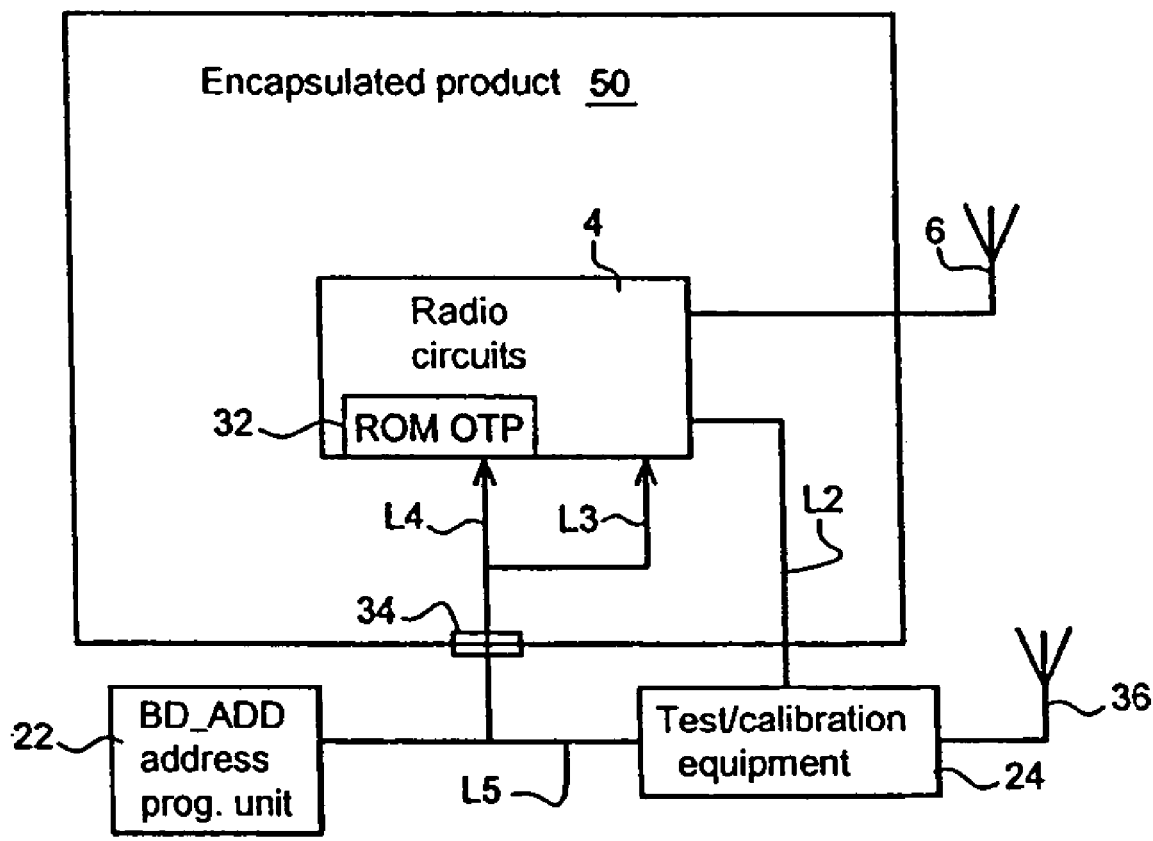
FIG. 5 is a flowchart according to a third embodiment of the invention that illustrates the preparation of encapsulated radio circuits of a communicating device according to the Bluetooth protocol.

The elements of FIGS. 3 to 5 that are also present in FIG. 1 or 2 are identified by the same references and will therefore not be described again for the sake of conciseness. They have the same function and the same hardware design, unless otherwise indicated. In addition, reference will be made to FIGS. 1 and 2 to understand these elements.

In the embodiments of the invention, one is free from the EEPROM 20 programmable or similar memory that is normally used for storage—among others—of the individual BD_ADD address of the communicating device 1 to the Bluetooth interface 2. Indeed, this address, as well as any other data element that can be conventionally stored in the EEPROM 20 or similar memory is stored instead in a versatile memory 32 that can also be used to store test data of the radio layer circuits 4. In other words, with respect to the state of the art presented in FIG. 2, this versatile memory 32 combines the functions for both the EEPROM memory 20 used, in particular, to store the BD_ADD address and the second memory 30 used to store the test data.

The memory 32 in the example is a ROM one time programmable type memory. This type is normally known as ROM-OTP. Indeed, the test/calibration operations, as well as the writing of the BD_ADD address are only required once for the entire set. It is advantageous in terms of cost and integration to use, for the versatile memory 32, ROM-OTP type technology.

Further, note that the ROM-OTP memory 32 according to the embodiment is physically integrated with the radio circuits 4 of the Bluetooth interface. In the example, the radio circuits are implemented on one or more chips, the ROM-OTP memory 32 is then implemented in the chip, or in one of the chips, of the radio circuits, this being, for example, a memory plane distributed as such in the surface of the radio circuit chip.

As a variant, the ROM-OTP memory 32 can be integrated in a chip of baseband circuits 8 or of circuits of other layers of the Bluetooth interface 2 that will be physically integrated with the radio circuits, for example, because this memory 32 is located in a common board or in a common chassis/encapsulation.

As indicated in FIG. 3, the embodiment provides a link L4 between the inputs of the versatile memory 32 and the connection point 34 of the communicating device 1, or more specifically, of the communication interface 2, accessible from the outside. In the example, the link L4 is an internal bus that is also linked to the link L3 through which the test/calibration equipment 24 exchanges the logical signals with the radio circuits 4.

The connection point 34 takes the form of a communication port, for example a serial type port, of the communicating device 1, or of a set of external pins of the chassis or of the casing of the radio circuits 4, normally in the form of an integrated circuit.

During the preparation phase of the communication interface 2, the connection point 34 is externally linked by a link L5, in turn, to the test/calibration equipment 24, and to the BD_ADD address programming unit 22.

This way, the programming unit 22 can write the BD_ADD address directly into this ROM-OTP memory 32 by passing successively through the link L5, the connection point 34, and the link L4. Likewise, the test/calibration equipment can write, in the ROM-OTP memory 32, the data relative to the test using links L5-34-L4, and it can also control the radio circuits 4 using links L5-34-L3. The exchange of radio signals between the radio circuits 4 and the test/calibration equipment 24 is performed using the specific wired link L2 that can transport radio frequency signals, for example, in the form of a coaxial cable. As a variant, this wired link L2 can be replaced with a radio link; the above-mentioned radio signals are then transported between the antenna 6 of the radio circuits 4 and an antenna 36 of the test/calibration equipment.

The writing of the BD_ADD address in the versatile memory ROM-OTP 32 can be done according to various modes (before or after storing test data, certification data, calibration data, and more.,) and at locations of the OTP memory 32 that will then be recognized as those from which this BD_ADD address must be extracted. The organization and management of these new storage locations in the versatile ROM OTP memory 32 is simple for those skilled in the art and can be perfectly integrated into the normal operation of the Bluetooth protocol.

If necessary, the capacity of the ROM-OTP memory 32 can be easily adapted to accommodate these new data elements (BD_ADD and others), depending on the applications to be used.

In addition, the test/calibration equipment 24 can be combined with the BD_ADD address programming unit 22 into a single multi-purpose set, for example by assigning the test/calibration equipment 24 the additional function of writing BD_ADD addresses. In this case, the external connection 34 will be linked, through the external link L5, only to this multi-purpose set.

FIG. 4 illustrates a variant of the first embodiment, that is different by the fact that the external link L5 with the connection point 34 includes a switch 38 that makes it possible to link selectively, to this external link, either the BD_ADD address programming unit 22 (position P2), or the test/calibration equipment 24 (position P2).

This arrangement allows programming, in two consecutive phases, the versatile ROM-OTP memory 32 separated in time: one for writing the BD_ADD address (and possibly other data relative to the applications) and the other for writing the test data. This approach makes it possible to space the two phases as desired and possibly to simplify the wiring of links L4 and L5. In all cases in the figure, the write order of the test data and the BD_ADD address is arbitrary.

Further, it is possible to cable only the test/calibration equipment 24 to the external connection 34 initially, during a test and write phase of the test data, and at another time and/or place, to cable only the BD_ADD address programming unit 22 to this external connection 34, when writing the BD_ADD address.

As in the assembly of FIG. 3, the wired radio frequency link L2 can be replaced by a wireless link using the antennas 6 and 36, respectively, of the radio circuits 4 and of the test/calibration equipment 24.

FIG. 5 illustrates a second embodiment of the invention, applicable, in particular, to program the versatile ROM OTP memory 32 during a final test of an integrated and encapsulated product 50 containing radio circuits 4. The radio circuits 4, which integrate the versatile ROM-OTP memory 32, can effectively be encapsulated or conditioned outside other Bluetooth interface circuits. The memory 32 is an integral part of the product, thus encapsulated product 50 makes it possible, on the one hand, to perform traditional tests on it with the test/calibration equipment 24, and additionally, to write in it, at the level of memory 32, both the data relative to these tests and the BD_ADD address of the communicating device for which this encapsulated product 50 is designed, using the address programming unit 22.

The encapsulated product 50, thus already individualized by the BD_ADD address can then be later integrated with other elements of the Bluetooth interface 2, for example, baseband circuits 8.

The assembly of this second embodiment is substantially the same as the one indicated in FIG. 3 in terms of links L3, L4, L5, and the external connection 34, which will not be described again for the sake of conciseness. This external connection 34 will be, of course, adapted according to the implementation method of the circuits and encapsulated product. As in the assemblies of FIGS. 3 and 4, the wired radio frequency link L2 can be replaced by a wireless link using the antennas 6 and 36, respectively, of radio circuits 4 and of the test/calibration equipment 24.

The fact of performing tests on an already encapsulated product 50, or more generally, in its encased form, is advantageous for obtaining, during these tests, its exact behavior, whilst taking into account the hardware environment of the components.

Of course, there can be a variant in which the encapsulated product 50 includes, additionally, other elements, such as baseband circuits 8 or other layers.

Furthermore, it is understood that the variant presented in FIG. 4 can be applied mutatis mutandis to this second embodiment.

The embodiments are applicable to all communicating devices according to the Bluetooth standard or to analogue standards, for example, the protocol known as "Zig Bee", and more.: computer, computer peripheral (printer, keyboard, scanner, and more.,) video or electronic photo cameras, personal digital assistant (PDA,) mobile telephone, GPS navigation, extension board that can be adapted to the ports of a PDA or computer or other device, home automation equipment, office, industrial, or scientific equipment, and more.

Figure 6:
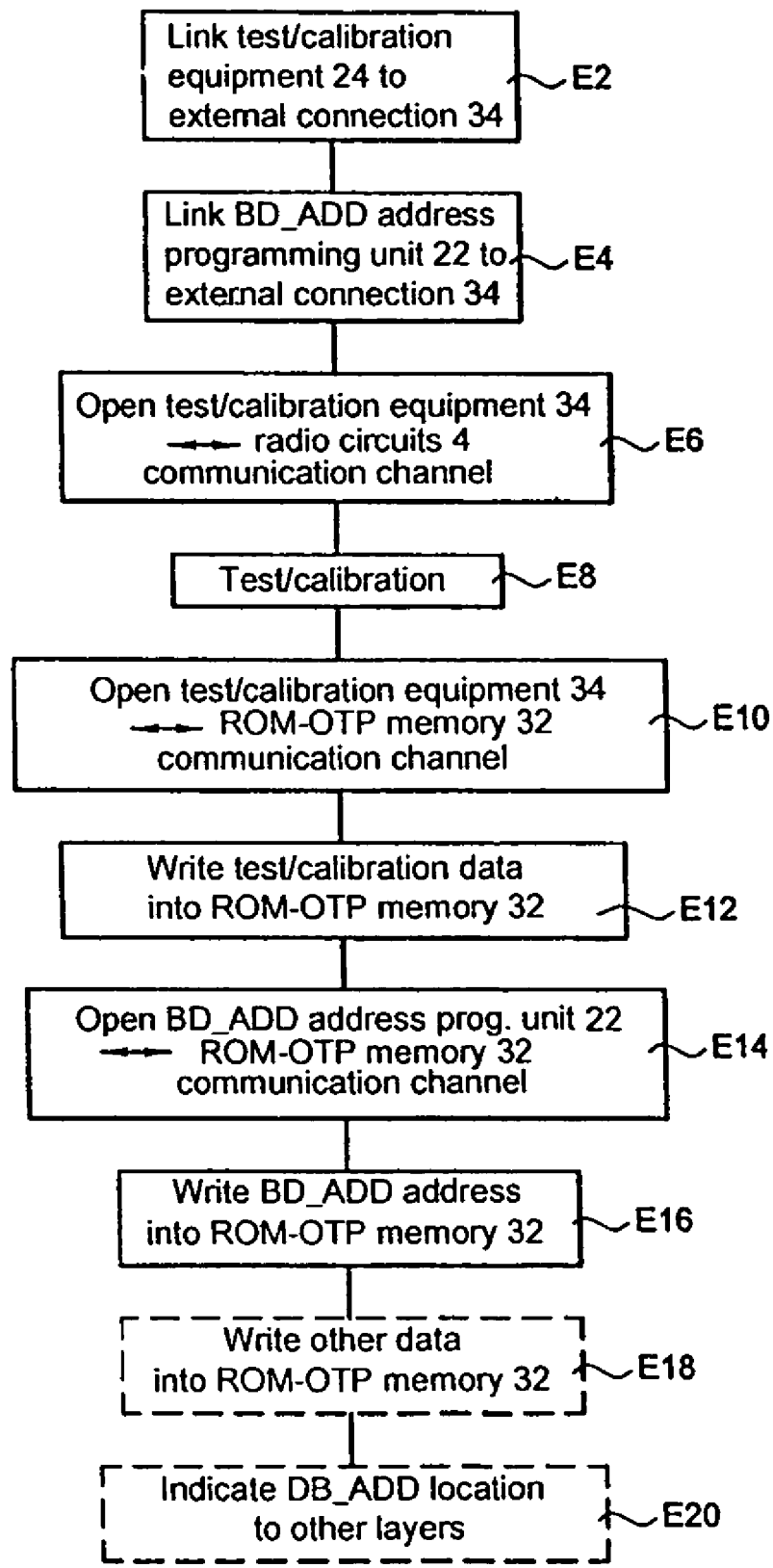
FIG. 6 is a flowchart of the various stages that intervene during the individualization and the test phase according to the first, second, or third embodiments of the invention.

FIG. 6 is a flowchart that illustrates a way, among many others, of preparing a communicating device 1 according to this invention.

First, the test/calibration equipment 24 is linked to the external connection 34 (stage E2) using the external link L5 (see FIG. 3-5). Moreover, the BD_ADD address programming unit 22 is also linked to this external connection (stage E4), also using the external link L5 (stage E4).

In the example, one begins with the test/calibration phase. The link L5 can be used as a multi-purpose interface resource, on the latter, a communications channel is opened between the test/calibration equipment 24 and the command terminals of the radio circuits 4 (stage E6) via the link L3, in order to configure the test modes in it.

Then, the tests and possibly the determination of calibration values to be recorded are performed (stage E8). As an example, the test/calibration equipment 24 can be the model sold by the company Rohde & Schwartz, reference R&S TS7160, adapted, notably, to the Bluetooth standard.

From the test phase, a communication channel is opened between the test/calibration equipment 24 and the versatile ROM-OTP 32 memory of the radio circuits 4 (stage E10) via the link L4.

Then, the test/calibration equipment 24 writes, in the ROM-OTP memory 32, the data relative to the tests (stage E12). As explained above, the extent of this data can range from a simple indication of compliance, possibly accompanied by a certification, to detailed results, and possibly to correction or calibration data.

From this phase, a communication channel is opened between the BD_ADD address programming unit 22 and the ROM-OTP memory 32 (Stage E14) via the link L4.

Then the BD_ADD address programming unit 22 writes, into the ROM-OTP memory 32, the individual BD_ADD address (stage E16) provided for the device 1 or for the radio circuits (see FIG. 5). This write operation is performed at a predetermined address of the versatile ROM-OTP memory 32 plane, which is made known to the layers that can invoke the BD_ADD address. As such, its reading is done transparently and does not cause any complication with respect to the traditional reading of the BD_ADD address using a dedicated memory (see EEPROM memory 20 in FIG. 2).

The writing of the BD_ADD address can be accompanied by the writing of other useful or necessary data, such as an encrypted key (or keys,) customization data, operating modes, and more. (stage E18) and that, in a traditional implementation, can be written in the EEPROM programmable memory 20 or similar memory for storing the BD_ADD address (see FIG. 2.) The fact that there may or may not be other such data to be written depends on the applications and conditions, and this stage E18 can therefore be omitted, depending on the scenario, which is why it is represented in dashed lines in FIG. 6.

Whatever the case may be (presence or not of stage E18), it is understood that the approach is the same; that is, to direct the data that normally would have been stored in a separate programmable memory, on the ROM-OTP memory 32 used to test the radio layer.

If necessary, the operation can be completed by a stage E20 whereby the data is loaded into one of the layers of the protocol indicating the fact that the BD_ADD address, and any other stage E18 data, must be extracted from the specific locations of the OTP memory 32. The optional character according to the cases of this stage E20 is indicated by its representation in dashed lines in FIG. 6.

Figure 7:
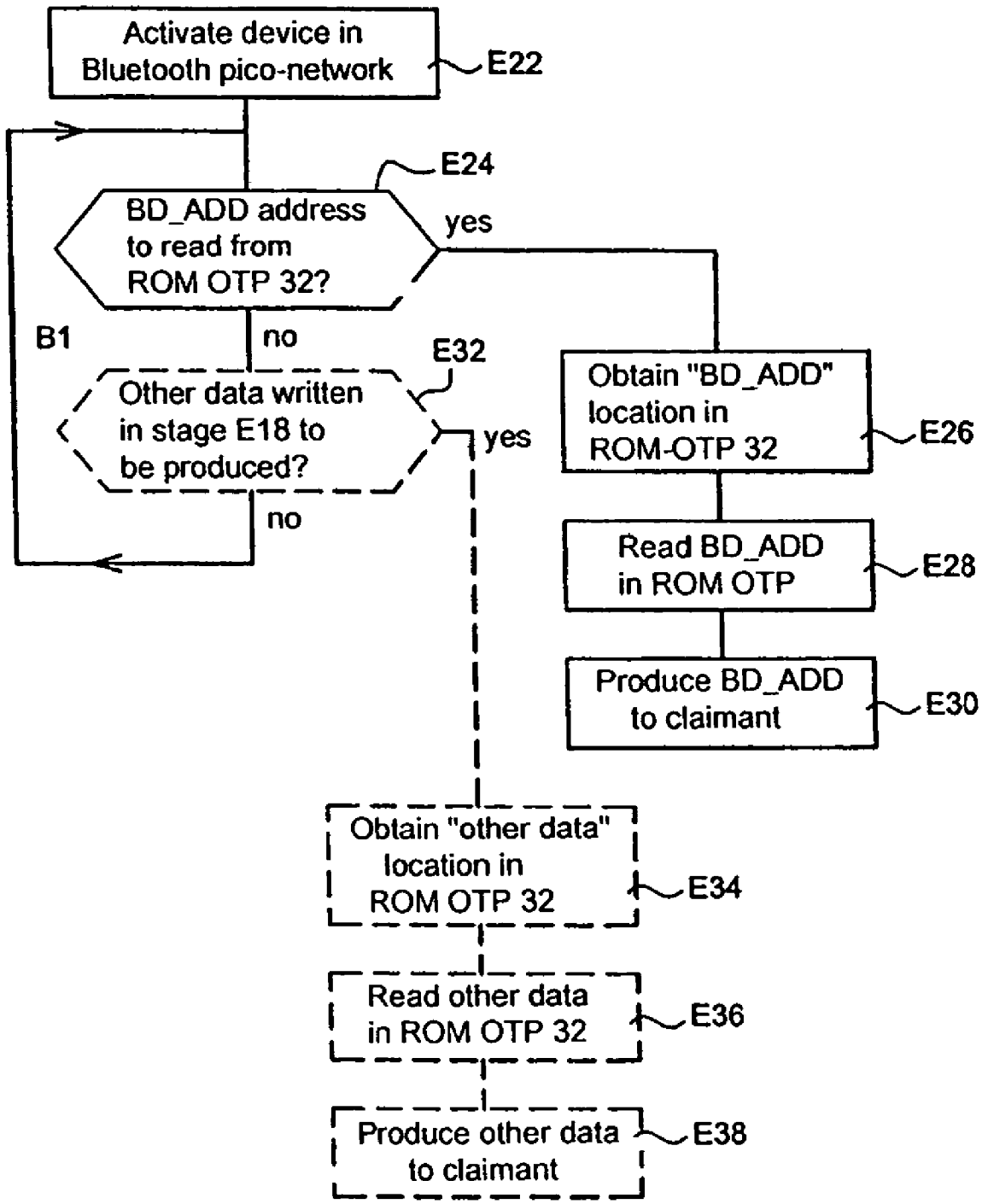
FIG. 7 is a flowchart of the various stages that intervene during the reading of a BD_ADD address of a device configured according to the first, second, or third embodiments of the invention.

FIG. 7 presents, in the form of a flowchart, a routine that allows the device 1 of FIGS. 3, 4, or the encapsulated product of FIG. 5, prepared according to the flowchart in FIG. 6, to produce its BD_ADD address when the latter is requested by a claimant. The claimant can be an internal layer of the device responding to an identification request.

The routine is initiated during an activation of the device 1 in a Bluetooth pico-network (stage E22). Normally, it is activated when the baseband 8 must read the BD_ADD address from the ROM-OTP memory 32, which is done when the device or the radio band 4 is initialized, and more generally any suitable time at which the baseband can use it. The routine starts by monitoring a request to read the BD_ADD address from the OTP memory 32, (stage E24 and loop B1). When such a request occurs, the routine searches the location of the OTP memory 32 in which the BD_ADD data is located (stage E26), for example, by referring to an address file of this memory. It then extracts the BD_ADD data from this location of the ROM-OTP memory 32 (stage E28) and produces it for the claimant (stage E30).

If other data has been written into the OTP memory 32 during stage E18 (see FIG. 6), then the routine can include, moreover, equivalent stages to extract this data (the optional character according to the cases of these stages is indicated by its representation in dashed lines in FIG. 7). Loop B1 therefore integrates a monitoring operation of a request to read the address of the other above-mentioned data (or a part of this data) (stage E32 and loop B1). When such a request occurs, the routine searches the location of the ROM-OTP memory 32 in which the data in question is located (stage E34). It then extracts this other data from this location (stage E36) and produces it to the claimant (stage E38).

Thus, according to the invention, it is no longer necessary to have a separate programmable memory 20 for storing the BD_ADD address. This results in an obvious reduction in manufacturing costs of the communicating interface and simplification of memorization resources management.

Furthermore, the common storage of test and BD_ADD address data makes it possible to group and rationalize the memory load operations of this data, saving time in production and post-production. The test and calibration equipment can notably also be used to write, into the memory 32, the BD_ADD address of each tested radio circuit 4 by integrating the functionalities of the BD_ADD address programming unit 22.

It is clear that the embodiments described can include numerous hardware and functional variations, as well as at the planning level of the various stages. For example, in all the embodiments, a radio link may be provided between the radio circuits and the test/calibration equipment 24 instead of the wired link L2.

Furthermore, it is possible to render the memory 32 interdependent of the radio circuits 4, whilst placing it outside the radio circuits, for example, by integrating them with the circuits of the baseband layer 8 if the latter are themselves physically interdependent of the radio circuits.

In the description, the test/calibration equipment 24 and the BD_ADD address programming unit 22 have been presented as separate elements. Nevertheless, it is clear that these two elements 24 and 22 can be combined into a single set, taking into account that they can henceforth be used on a single workstation and in tandem.

It is understood that the BD_ADD address can also be written into the memory 32 before or after the test data.

Furthermore, the invention can also be applied to other communication protocols—for example, the "Zig Bee" protocol, and more.—where a similar technical issue arises and where the solution according to the invention can be advantageously used.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for individually testing a radio frequency circuit of a wireless communication interface of a communicating device adapted for a pico-network protocol, the pico-network protocol based upon a stack of hardware protocol layers including a radio protocol layer, a baseband protocol layer and a link management protocol layer, the method comprising:

operating on a wireless communication interface at least one radio frequency circuit, wherein an individual identification address for communication is assigned to the wireless communication interface uniquely for each radio frequency circuit, and wherein the at least one radio frequency circuit is physically integrated in a chip with circuits of the radio protocol layer of the pico-network protocol;

electrically coupling to the wireless communication interface, a single physical programmable array of read only memory for recording both test data associated with an operating test phase of the radio frequency circuit and the individual identification address, without a need to reprogram the read only memory in order to complete the individual testing and calibration of the radio frequency circuit, wherein the single physical programmable array of read only memory is physically integrated in a chip with circuits of one of the baseband protocol layer and the link management protocol layer.

2. The method according to claim 1, wherein the memory is integrated into a chip of the radio frequency circuit.

3. The method according to claim 1, further comprising:
performing at least one communication interface test; and
writing into the memory without regard to order:
at least one data element relative to the communication interface test, and
the identification address, when operating a communication interface in an encapsulated product form.

4. The method according to claim 1, wherein the identification address is written into the memory before the radio frequency circuit are connected to other elements that comprise the wireless communication interface.

5. The method according to claim 1, wherein the identification address is written into the memory after the radio frequency circuit has been connected to other elements of the wireless communication interface, and before a connection of the wireless communication interface with a communicating device.

6. The method according to claim 1, wherein the operating on the wireless communication interface includes a device of a type of device that communicates over a wireless network, the identification address being an address used to recognize the device in the network.

7. The method according to claim 6, wherein the device is the type of device that communicates over a pico-network according to a Bluetooth compatible protocol.

8. The method according to claim 1, wherein the memory is a one time programmable memory.

9. The method according to claim 8, wherein at least one other data element normally grouped with the identification address is also stored in the memory.

10. The method according to claim 1, wherein at least one of the following is also stored in the memory:
   encryption/decryption data;
   data relative to a specific operating mode; and
   customization data.

11. The method according to claim 1, wherein the data relative to an operating test phase of the interface include at least one of the following:
   an indication of a compliance of the interface with respect to a tested parameter or a tested set of parameters;
   a validity certificate according to the communication protocol; and
   at least one of calibration and correction data of the communication interface circuits.

12. A wireless communication interface operating in accordance with the method of claim 1.

13. A wireless communication interface for a communicating device to which an individual identification address is assigned for communication, the wireless communication interface comprising:
   at least one radio frequency circuit which is unique for the communication interface so that each radio frequency circuit is tested individually; and
   a single physical programmable array of read only memory integrated in a chip with circuits of one of a baseband protocol layer and a link management protocol layer of a pico-network protocol, the single physical programmable array of read only memory designed to record both test data relative to an operating test phase of the radio frequency circuit and the individual identification address,
   wherein the single physical programmable array of read only memory stores the individual identification address without a need to reprogram the read only memory in order to complete the individual testing and calibration of the radio frequency circuit.

14. The wireless communication interface according to claim 13, wherein the memory is a one time programmable (OTP)-type memory.

15. The wireless communication interface according to claim 13, wherein the memory also stores at least one other data element normally grouped with a specific address.

16. A wireless communication device adapted for a pico-network protocol, the pico-network protocol based upon a stack of hardware protocol layers including a radio protocol layer, a baseband protocol layer and a link management protocol layer, the wireless communication device comprising:
   an interface to which an individual identification address is assigned for communication;
   at least one radio frequency circuit that is unique for the communication interface so that each radio frequency circuit is tested individually, the at least one radio frequency circuit integrated in one or more chips that include circuits of the radio protocol layer; and
   a single physical programmable array of read only memory integrated in a chip with circuits of one of the baseband protocol layer and the link management protocol layer, the single physical programmable array of read only memory designed to record both test data relative to an operating test phase of the radio frequency circuit and the individual identification address,
   wherein the single physical programmable array of read only memory stores the individual identification address without a need to reprogram the read only memory in order to complete the individual testing and calibration of the radio frequency circuit.

17. The wireless communication device according to claim 16, further comprising:
   a stage for reading and providing a claimant with the identification address, wherein in that the stage includes the reading of the identification address from the memory used additionally to record data relative to the operating test phase of the interface.

18. The wireless communication device according to claim 17, including a stage for reading and providing a claimant with at least one other data element normally grouped with a specific address, wherein the stage includes reading of the other data element from the memory used additionally to record the data relative to the operating test phase of the interface.

19. The wireless communication device according to claim 18, wherein the radio frequency circuit further comprises:
   a connection port whose output is adapted to write into the memory the identification address, and to write into the memory the data relative to the test.

20. The wireless communication device of claim 16, wherein the pico-network protocol is a Bluetooth protocol.

* * * * *